(No Model.)

C. K. BRADFORD.
ABRADING MACHINE.

No. 333,991. Patented Jan. 12, 1886.

Witnesses.
G. B. Maynadier
John R. Snow.

Inventor.
Chas K Bradford

United States Patent Office.

CHARLES K. BRADFORD, OF LYNNFIELD, ASSIGNOR TO G. H. P. FLAGG, TRUSTEE, OF BOSTON, MASSACHUSETTS.

ABRADING-MACHINE.

SPECIFICATION forming part of Letters Patent No. 333,991, dated January 12, 1886.

Application filed March 22, 1884. Serial No. 125,134. (No model.)

*To all whom it may concern:*

Be it known that I, CHARLES K. BRADFORD, of Lynnfield, in the county of Essex and State of Massachusetts, have invented an Improvement in Abrading-Machines, of which the following is a specification, reference being had to the accompanying drawings, making a part thereof, in which—

Figure 1:
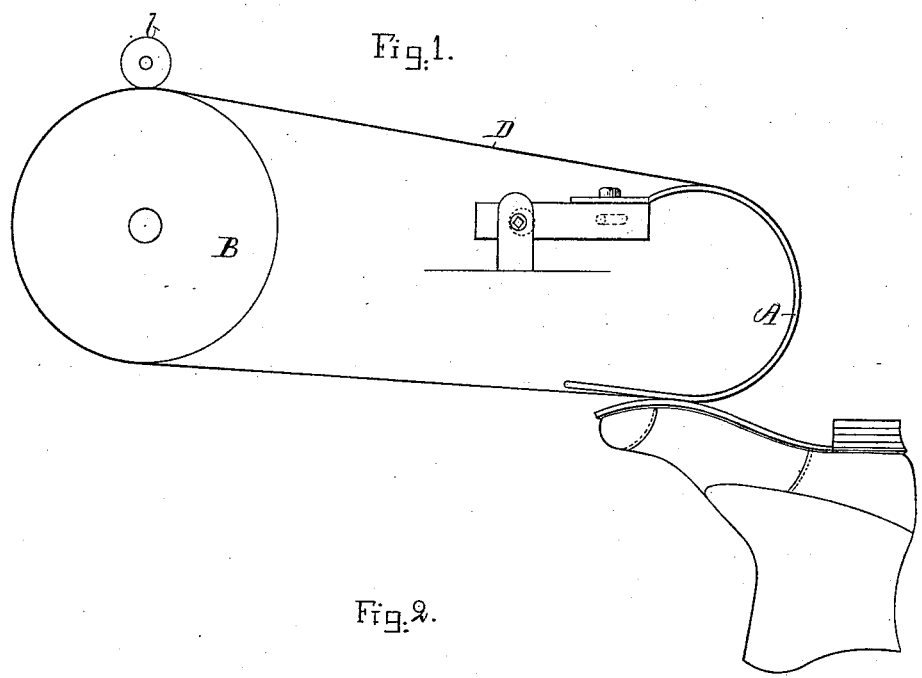
Figure 2:
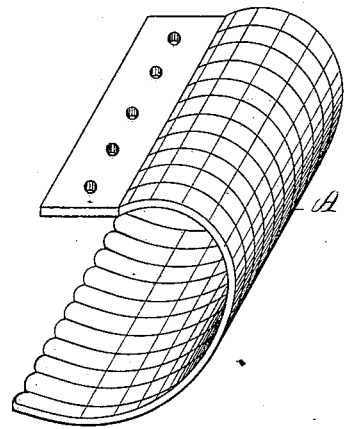

Figure 1 is a side view of a portion of a machine for buffing or abrading the bottoms of soles, illustrating my invention; and Fig. 2 is a perspective view of the yielding support for the belt, whose combination with the driving-pulley constitutes my invention.

My invention relates to that class of machines in which a belt is used with an abrading-surface, examples of which may be seen in United States Patents No. 247,315, dated September 20, 1881, and No. 294,766, dated March 11, 1884. In all machines of this class the belt has run upon two or more pulleys; and my invention consists in the substitution for one of these pulleys of a support for the belt, which does not revolve, but otherwise acts as a pulley, and which is made yielding, so that when the shoe-sole or other thing to be abraded is pressed against the belt the support will yield, and thereby allow the belt to conform somewhat to the shape of the article.

In brief, the novel feature of my invention is a non-revolving pulley, which is also a cushion, and its advantages are, that the belt will run for all practical purposes as well as if it were a revolving pulley, while its elasticity can readily be suited with the utmost nicety to the work to be done, and may be such that the amount of surface contact between an article with a curved surface and the belt may be greatly increased over what is possible in any other machine of this class known to me.

My machine is of any appropriate construction in all its parts, except as to its novel feature—the yielding non-revolving support A.

In the drawings, B is the driving-pulley, mounted as usual, and D the belt. To facilitate the removal and replacing of the belt D, the support A is adapted to be moved so as to decrease or increase the distance between its middle portion or axis and the axis of pulley B. Suitable devices for this purpose are shown in the patents above named, and are not therefore further described.

The required degree of elasticity of the support A will depend upon the work to be done, as will be clear to all skilled in the art; but in many cases, if made of metal and sufficiently thin to be sufficiently yielding, it will be too thin in parts for practical use, and for that reason it is often desirable to make it in the form of a number of spring-fingers, as shown in the drawings.

In most cases it is desirable to use a tightening-pulley, *b*, as indicated in the drawings; but the various ways of mounting this pulley *b* are too well known to need description.

I have shown the support A as made up of a frame, upon which is secured a curved metal plate, and this is the simplest form known to me; but it will be plain that many other forms of my invention may be constructed, its principle being the combination, with the driving-pulley, of a support, part of which is the segment of a pulley, but does not revolve, and part of which forms a cushion.

If the belt be too tight, the support A will heat; but, when the pulley *b* is used, the belt may be slack along its whole upper portion, as shown in Fig. 1; but in all cases I prefer to use a current of air to keep the belt and the support cool, and I find in practice that this current of air is best applied at the angle which is shown in Fig. 1 as formed by the upper portion of the belt D and the upper portion of the support A.

What I claim as my invention is—

The combination of pulley B, belt D, and the non-revolving, yielding, curved support A, substantially as and for the purpose described.

CHAS. K. BRADFORD.

Witnesses:
 J. E. MAYNADIER,
 JOHN R. SNOW.